US008441194B2

(12) United States Patent
Huang

(10) Patent No.: US 8,441,194 B2
(45) Date of Patent: May 14, 2013

(54) MULTI-FUNCTION VEHICLE LIGHT ASSEMBLY

(76) Inventor: Yao-Hung Huang, Tainan (TW)

( * ) Notice: Subject to any disclaimer, the term of this patent is extended or adjusted under 35 U.S.C. 154(b) by 335 days.

(21) Appl. No.: 12/931,375

(22) Filed: Jan. 31, 2011

(65) Prior Publication Data

US 2012/0194072 A1   Aug. 2, 2012

(51) Int. Cl.
B60Q 1/26 (2006.01)
H01K 7/00 (2006.01)

(52) U.S. Cl.
USPC .............................. 315/80; 315/76

(58) Field of Classification Search .......... 315/76, 315/77, 78, 80, 81, 82, 84; 340/468, 469, 340/470, 475, 476, 477, 478, 479
See application file for complete search history.

(56) References Cited

U.S. PATENT DOCUMENTS

| 1,513,300 | A | 10/1924 | Vose |
| 1,526,868 | A | 2/1925 | Petrovich |
| 1,567,193 | A | 12/1925 | Ritz-Woller |
| 1,887,087 | A | 11/1932 | Frizner |
| 5,150,959 | A | 9/1992 | Paffrath et al. |
| 5,567,036 | A | 10/1996 | Theobald et al. |
| 5,896,084 | A | 4/1999 | Weiss et al. |
| 6,095,663 | A | 8/2000 | Pond et al. |
| 6,533,445 | B1 | 3/2003 | Rogers |
| 6,947,577 | B2* | 9/2005 | Stam et al. ............... 382/104 |
| 7,332,877 | B2* | 2/2008 | Crodian et al. ........... 315/297 |
| 7,646,291 | B2* | 1/2010 | Counts ..................... 340/468 |

* cited by examiner

Primary Examiner — Minh D A
(74) Attorney, Agent, or Firm — Albert O. Cota

(57) ABSTRACT

A multi-function vehicle light assembly (10) (MVLA 10) that is designed to provide a compact light assembly that incorporates in a single enclosure (24) a plurality of LED modules (16). Each module (16) produces a white light that indicates that a vehicle is in reverse, an amber light that indicates that a vehicle is making a right or a left turn, and a red light that functions as a vehicle tail light and to also indicate that the vehicle brakes are being applied. Two embodiments are disclosed in the first embodiment the plurality of LED modules (16) directly produce a set of white, amber and red lights. In the second embodiment an LED module (16) is utilized that includes a blue, green and red LEDs that are selectively combined by an LED control module (22) to provide the required white, amber and red lights.

18 Claims, 3 Drawing Sheets

MULTI-FUNCTION VEHICLE LIGHT ASSEMBLY

TECHNICAL FIELD

The invention generally pertains to vehicle light assemblies, and more particularly to a multi-function vehicle light assembly (MVLA). The MVLA is contained within a single enclosure that utilizes a combination of LEDs to provide the standard colors that indicate a reverse signal, a right and left turn signal, and a tail light and brake signal.

BACKGROUND ART

Conventional rear light vehicle assemblies utilize LEDs or halogen bulbs to illuminate a reverse light, as well as a right and left turn light. The halogen light bulbs and LEDs are selected to provide a particular color such as a white light for a reverse signal, or a red light for a tail-light and brake light.

In conventional tail-light assemblies that use halogen bulbs, three colored lights are required to produce a white light, an amber light and a red light. Alternatively, later vehicle models use colored LEDs to provide the required colors. LEDs have a longer useful life, conserve energy and are friendly to the environment. Also, by using colored LEDs, the necessity to have colored lights is not required because the individual LEDs provide the required colors, namely white, amber and red.

A search of the prior art did not disclose literature or patents that read directly on the claims of the instant invention. However, the following U.S. patents are considered related.

| PAT. NO. | INVENTOR | ISSUED |
| --- | --- | --- |
| 6,533,445B1 | Rogers | 18 Mar. 2003 |
| 5,896,084 | Weiss et al | 20 Apr. 1999 |
| 5,567,036 | Theobald et al | 22 Oct. 1996 |

The U.S. Pat. No. 6,533,445 discloses a unitary multiple light assembly for motor vehicle trailers. The assembly uses different arrays of LEDs to illuminate a side marker light, a rear tail or brake light, and a license plate light. A license plate attaching bracket holds the license plate in a location in which individual LEDs in a light fixture can shine directly on the license plate.

The U.S. Pat. No. 5,896,084 discloses a tail light assembly for a motor vehicle. The assembly includes a rear light, a brake light, and a turn signal light, wherein the rear light, the brake light, and the turn signal lights are comprised of LEDs. The assembly also includes a control device for operating the LEDs at a constant current for a given voltage range.

The U.S. Pat. No. 5,567,036 discloses a side marker lamp that is used for truck/trailer combinations. The lamp utilizes LEDs that are mounted to a plurality of circuit boards. The circuit boards are mounted at predetermined angles relative to each other for directing light in at least three directions. A lens is placed in front the LEDs and includes a series of prism optics for spreading the light emitted from the LEDs into an arc of up to 180 degrees.

For background purposes and as indicative of the art to which the invention relates, reference may be made to the following remaining patents found in the search.

| PAT. NO. | INVENTOR | ISSUED |
| --- | --- | --- |
| 6,095,663 | Pond et al | 1 Aug. 2000 |
| 5,150,959 | Paffrath et al | 29 Sep. 1992 |
| 1,887,087 | Frizner | 8 Nov. 1932 |
| 1,567,193 | Ritz-Woller | 29 Dec. 1925 |
| 1,526,868 | Petrovich | 17 Feb. 1925 |
| 1,513,300 | Vose | 28 Oct. 1924 |

DISCLOSURE OF THE INVENTION

The multi-functional vehicle light assembly (MVLA) is designed to provide within a single hermetic enclosure all the rear and side facing lights that are required to operate the MVLA. For purposes of this disclosure, a vehicle is defined as an automobile, a truck, an SUV, a trailer, a trailer truck, a boat and military vehicles. The required lights include a reverse light, a turn-signal light, a brake light and a tail light.

In its basic design configuration, the MVLA is comprised of an electrical circuit having means for activating a plurality of LED modules. Each module produces a white light indicating that the vehicle has been placed or is traveling in reverse, an amber light indicating that the vehicle is about to make a right or a left turn, and a red light which functions as a vehicle tail-light and as a brake light. The MVLA is housed in an enclosure that is dimensioned to hermetically enclose the electrical circuit and has structural means for being attached to either the rear or to the side of a vehicle.

The MVLA is disclosed as a first embodiment and as a second embodiment. The first embodiment utilizes a plurality of LED modules which are comprised of triple-chip LEDs that produce the three colors red, amber and white that are required to function as a vehicle tail light assembly. Red for brake and tail lights, amber for turn signals and white for a reverse signal.

The second embodiment utilizes a plurality of LED modules which are comprised of triple-chip LEDs that produce a red, blue and green color. To obtain an amber light, the red and green colors are combined and turned "on" simultaneously. To obtain a white light for reverse, all three of the red, blue and green colors are combined and turned "on" simultaneously. The second embodiment also utilizes an LED control module that determines which lights must be activated and combined to produce the required colors to emulate the function of a vehicle tail light assembly.

In view of the above disclosure the primary object of the invention is to produce an MVLA that is integrated into a single hermetic enclosure and that can be designed to be used in either the first or the second embodiment. The first embodiment utilizes a plurality of LED modules, wherein each module has a set of LEDs that produce the white, amber and red colors that are required by the MVLA. The second embodiment utilizes blue, green and red LEDs that are automatically combined to produce the required white, amber and red colors.

In addition to the primary object of the invention, it is also an object of the invention to produce an MVLA that:

can be used as a tail or as a side light,
is protected from inclement weather,
can be produced in various colors,
can be produced in various shapes, and
is cost effective from both a manufacturer's and consumer's point of view.

These and other objects and advantages of the present invention will become apparent from the subsequent detailed

BEST MODE FOR CARRYING OUT THE INVENTION

The best mode for carrying out the invention is presented in terms that disclose a first embodiment and a second embodiment for a multi-function vehicle light assembly (MVLA). Both embodiments are designed to simplify the design and increase the useful life and the reliability of the MVLA 10.

Figure 3:
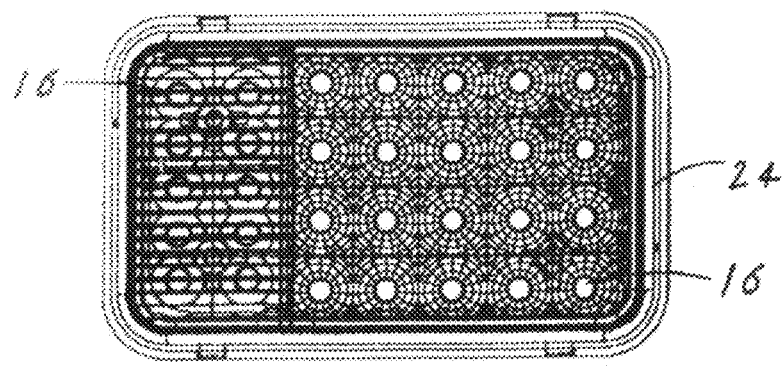
FIG. 3 is a front view of a typical enclosure that is used to house the MVLA.
Figure 4:
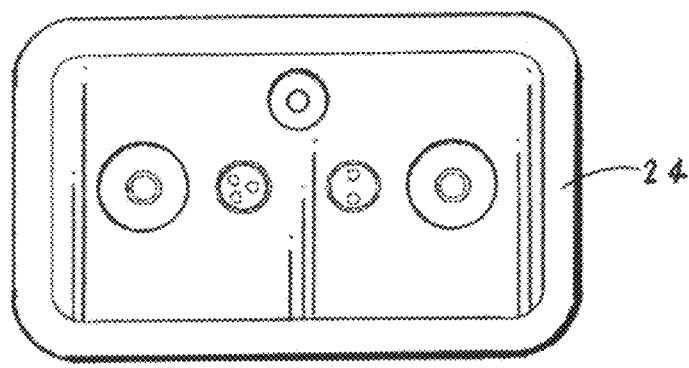
FIG. 4 is a rear view of the enclosure.
Figure 5:
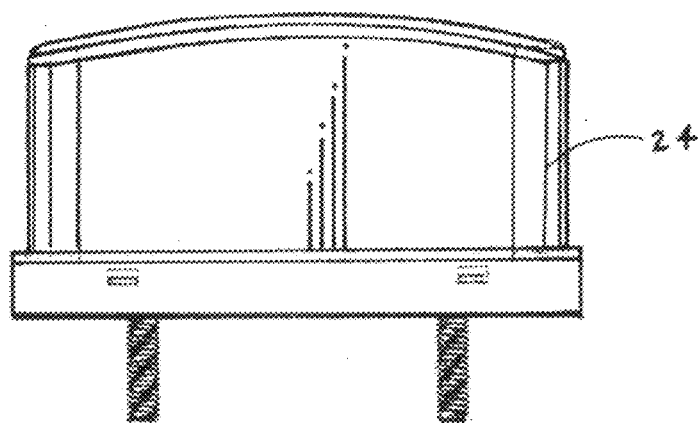
FIG. 5 is an elevational side view of the enclosure.

The first embodiment of the MVLA 10 functions in combination with a vehicle having a transmission with a reverse position, a turn lever, a brake pedal and a tail-light switch. The first embodiment, as shown in FIGS. 1, 3-5, includes five components: a vehicle function select circuit 12, an LED drive circuit 14, an LED module 16, an LED control circuit 18 and an LED brightness adjust circuit 20. All the circuits that comprise the MVLA are housed within a hermetically sealed, moisture resistant enclosure 24, as shown in FIGS. 3-5.

Figure 1:
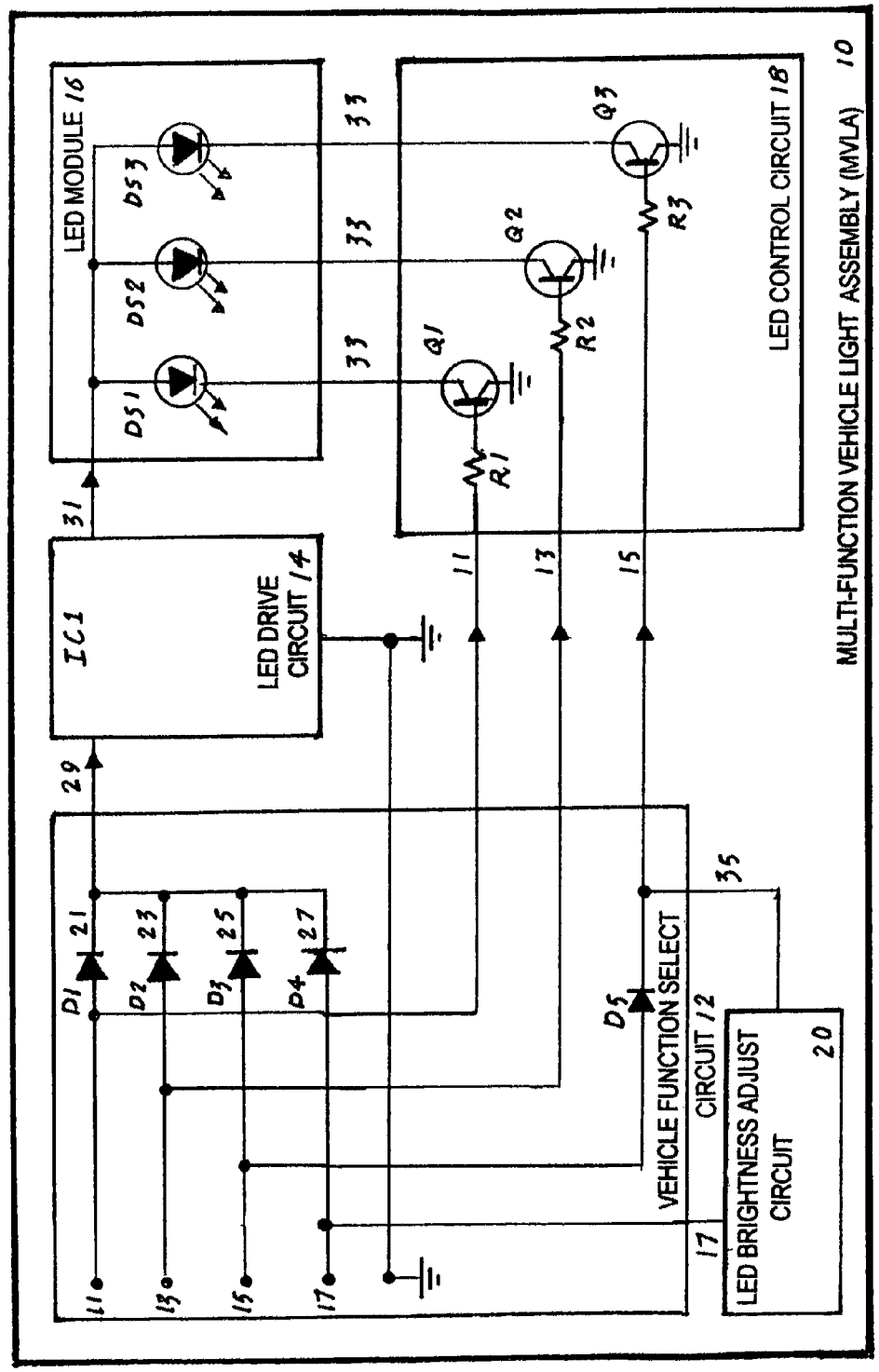
FIG. 1 is a schematic-block diagram of a first embodiment of a multi-function vehicle light assembly (MVLA) that utilizes a plurality of LED modules, wherein each module produces a white light to indicate that a vehicle has been placed in reverse, an amber light to indicate that the vehicle is about to make a turn, and a red light which functions as both a vehicle tail light and as a brake light.

The vehicle function select circuit 12, as shown in FIG. 1, has means for receiving and processing five input and five output signal lines that comprise: a reverse input signal 11 and producing through an isolation diode D1, a reverse output signal 21; a turn input signal 13 and producing through an isolation diode D2, a turn output signal 23; a brake input signal 15 and producing through an isolation diode D3, a brake output signal 25; a tail-light input signal 17 and producing through an isolation diode D4, a tail-light output signal 27. The fifth line is attached to the chassis of the vehicle which provides a circuit ground 19. The function select circuit 12 selectively produces a single function select signal 29 that corresponds to the particular vehicle input signal that is being applied.

The LED drive circuit 14 has means for receiving and processing the single function select signal 29 and producing an LED drive signal 31. The LED drive circuit 14 is comprised of an integrated circuit IC1, preferably consisting of a GL2596 step-down voltage regulator manufactured by the Gleam Corporation. However, other step-down voltage regulators can also be utilized. Note that no power is applied to any circuit of the MVLA 10 until an input signal 11, 13, 15 and 17 is applied to the input side of at least one of the diodes D1-D4 from where the single function select signal 29 is produced that powers the GL2596. Once power is applied, the GL2596 produces an LED drive signal 31 which consists of a fixed voltage that is applied to the anodes of each of the LEDs that comprise the LED module 16, as shown in FIG. 1.

In the first embodiment, each LED module 16 is comprised of a triple-chip LED that produces a white light DS1, an amber light DS2 and a red light DS3. The white light DS1 indicates a vehicle reverse movement, the amber light DS2 indicates a vehicle turn signal and the red light DS3 functions as a vehicle tail light and a vehicle brake signal. For brevity of disclosure, only one LED module 16 is shown in FIG. 1. However, in the actual design of the MVLA 10 a plurality of LED modules 16 are utilizing that can range from two to forty modules 16. The modules are preferably connected in a serial-parallel configuration and an array of thirty LED modules 16 are preferably utilized, as shown in FIG. 3. As shown in FIG. 1, the anode of each LED is connected to the LED drive signal 31 that is applied from the LED drive circuit 14. The output produced by each of the LED modules 16 is an LED control signal 33 that is taken from the respective cathode of the three LEDs DS1, DS2 and DS3.

The LED control circuit 18, as shown in FIG. 1, is comprised of 1. a transistor Q1 having a base that is applied the reverse input signal 11 through a resistor R1. The collector of transistor Q1 is connected to the cathode of the white LED DS1 and the emitter of transistor Q1 is connected to circuit ground,
2. a transistor Q2 having a base that is applied the turn input signal 13 through a resistor R2. The collector of transistor Q2 is connected to the cathode of the amber LED DS2 and the emitter is connected to circuit ground,
3. a transistor Q3 having a base that is applied the brake input signal 15 through a resistor R3 and diode D5. The diode D5 is an isolation diode that functions to prevent the voltage at the output of the LED brightness adjust circuit 20 from feeding back to the vehicle brake line. The collector of transistor Q3 is connected to the cathode of LED DS3 and the emitter of transistor Q3 is connected to circuit ground. The brake input signal 15 is applied at a maximum current when the vehicle brake pedal is applied which then causes the red LED DS3 to illuminate at maximum brightness.

The final circuit that comprises the MVLA 10 is an LED brightness adjust circuit 20 having means for receiving and processing the tail-light input signal 17, and producing an LED dimming signal 35 that is applied to the base of transistor Q3 through current limiting resistor R3. The circuit 20 limits the current applied to transistor Q3 which, in turn, dims the illumination provided by LED DS3 when the tail-light is "on" and the brake pedal is not depressed.

Operation

Tail Light

The power from the tail-light input signal 17 is applied through diode D4 to the input 29 of the LED drive circuit 14. Once power is applied, the LED drive circuit 14 produces an LED drive signal 31 which consists of a fixed voltage that is applied to the anodes of the multi-colored LEDs in the LED modules 16. At this point, none of the LEDs have been turned "on".

Power is also applied to the input of the LED brightness adjust circuit 20 via the signal 17 which limits the brightness of the tail-light LEDs. The power from the circuit 20 is utilized to power transistor Q3. Once the circuit 20 becomes active, transistor Q3 turns "on", completing the circuit which causes the LED DS3 to turn "on". Note that the circuit 20 turns "on" LED DS3 but limits its brightness to less than its full brightness.

Brake Light

When the brake input signal 15 is activated, the power from the signal 15 is applied through diode D3 to produce a single function select signal 29 that is applied to the input of the LED drive circuit 14. The output of the circuit 14 is the LED drive signal 31 which is applied through LED DS3, the LED control signal 33 and subsequently to the collector of transistor Q3. When the signal 15 is active, it bypasses the brightness adjust circuit 20 and applies full power directly to transistor Q3 through isolation diode D5, as shown in FIG. 1. Thus, causing the LED DS3 to illuminate to full brightness when the brake pedal is depressed, enabling a person in the vehicle behind to know that the brakes have been applied when the tail-light is already on.

Turn Signal

When power is applied from the turn input signal 13, the power is applied through diode D2 to produce a single function select signal 29 that is applied to the input of the LED drive circuit 14 that produces the LED drive signal 31 which applies power to the anodes all the LEDs in the LED module 16. The output of the module 16 is the LED control signal 33 which is applied to the collector of the transistor's Q1, Q2 and Q3. The power from the turn input signal 13 is also applied through resistor R2 directly to the base of transistor Q2 causing the transistor Q2 to turn on, further causing the amber LEDs to blink "on" and "off" indicating a vehicle is making a turn. There is no control module shown that will cause an amber LED DS2 to blink "on" and "off". However, the turn input signal 13 is connected in parallel with the vehicle's turn signal indicator wire, which allows the amber LED DS2 to illuminate and blink in concert with the blink rate of the vehicle turn signal. The reverse light functions in the same manner as described above except it activates transistor Q1 and the white LED DS1 when the vehicle is placed in reverse.

The second embodiment of the MVLA 10, as shown in FIGS. 2-5 utilizes a different LED module 16 and the LED brightness adjust circuit 20 is replaced by an LED control module 22. The LED module 16 in the preferred configuration is comprised of a plurality of LED modules 16, wherein each module 16 is further comprised of a triple-chip LED that produces a red LED DS1, a blue LED DS2 and a green LED DS3. The LED control module 22 determines which of the LEDs are to be activated and combined to produce the required colors to emulate the functions of a vehicle tail light.

As in the first embodiment of the MVLA 10 there are four input signals (11-17) that are applied to the MVLA 10 plus a common circuit ground 19 for a total of five signals.

Diodes D1-D4 located in the vehicle function select circuit 12 function as steering diodes which prevent the voltage on any one input signal from being applied to any of the other input signal. When any one or more lines become active, the single function select signal 29 applies a voltage to the input of the LED drive circuit 14. The circuit 14 produces an LED drive signal 31 consisting of fixed output voltage that is applied to the anode of all three LEDs DS1, DS2 and DS3 located in each of the LED modules 16. At this point, none of the LEDs are activated.

Figure 2:
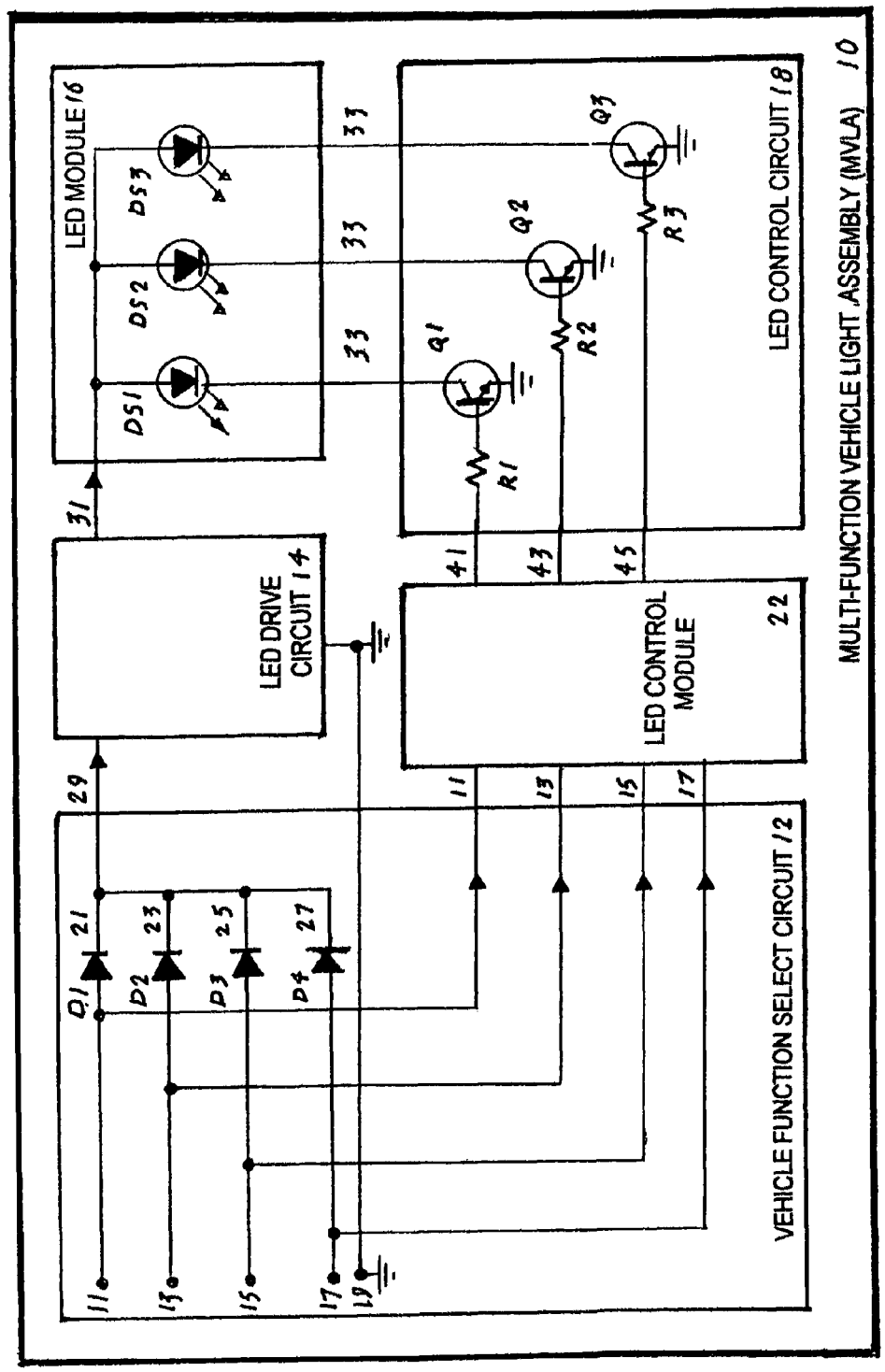
FIG. 2 is a schematic block diagram of an MVLA that utilizes a plurality of LED modules, wherein each module produces a blue light, a green light, and a red LED, wherein the three lights are selectively activated and combined to produce a white light, an amber light and a red light.

The LED control module 22, preferably utilizes a microprocessor IC however, the module 22 can also be designed using discrete components. As shown in FIG. 2, all four signal lines 11, 13, 15 and 17 are directly applied to the input of the LED control module 22. The control module 22 then determines which line or lines are active and which of the LEDs DS1, DS2 or DS3 or a combination of the three LEDs are to be activated and combined to produce the required colors to operate the MVLA 10. The output of the LED control module 22 is a blue activation signal 41 that is applied through resistor R1 to the base of transistor Q1, a green activation signal 43 that is applied through resistor R2 to the base of transistor Q2 and a red activation signal 45 that is applied through resistor R3 to the base of transistor Q3. To obtain an amber light the red and the green LEDs are turned "on" simultaneously. To obtain a white light the red, blue and green LEDs must be turned "on" simultaneously and combined. The red color of the tail-light and the brake light and their intensities are also determined by the LED control module 22.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A multi-function vehicle light assembly (MVLA) that operates in combination with a vehicle having a transmission with a reverse position, a turn lever, a brake pedal and a tail light switch, said MVLA comprising:

a) a vehicle function select circuit (12) having means for receiving and processing:
  (1) a reverse input signal (11) and producing through an isolation diode (D1) a reverse output signal (21),
  (2) a turn input signal (13) and producing through an isolation diode (D2) a turn output signal (23),
  (3) a brake input signal (15) and producing through an isolation diode (D3) a brake output signal (25),
  (4) a tail-light input signal (17) and producing through an isolation diode (D4) a tail-light output signal (27), wherein said function select circuit (12) selectively produces a single function select signal (29) that is dependent upon the particular vehicle function that is selected, b) an LED drive circuit (14) having means for receiving and processing the function select signal (29) and producing an LED drive signal (31), c) a plurality of LED modules (16) each containing a white LED (DS1), an amber LED (DS2) and a red LED (DS3), wherein to the anode of each LED is applied the LED drive signal (31), wherein the output from the module (16) is an LED control signal (33) taken from the respective cathode of each of the three LEDs (DS1), (DS2) and (DS3), d) an LED control circuit (18) comprising:
  (1) a transistor (Q1) having a base that is applied the reverse input signal (12) through a resistor (R1), the collector of transistor (Q1) is connected to the cathode of LED (DS1) and the emitter of transistor (Q1) is connected to circuit ground,
  (2) a transistor (Q2) having a base that is applied the turn input signal (13) through a resistor (R2), the collector of transistor (Q2) is connected to the cathode of LED (DS2) and the emitter is connected to circuit ground,
  (3) a transistor (Q3) having a base that is applied the brake input signal (15) through a resistor (R3) and an isolation diode (D5), the collector of transistor (Q3) is connected to the cathode of LED (DS3) and the emitter of transistor (Q3) is connected to circuit ground, wherein the brake input signal (15) is applied at maximum current when the vehicle brake pedal is depressed which then causes the red LED (DS3) to illuminate at maximum brightness, and e) an LED brightness adjust circuit (20) having means for receiving and processing the tail-light input signal (17), and producing an LED dimming signal (35) that is applied to the base of transistor (Q3) through current limiting resistor (R3), wherein said circuit (20) limits the current applied to transistor (Q3) which, in turn, dims the illumination provided by the red LED (DS3) when the tail-light is "on" and the brake pedal is not depressed.

2. The MVLA as specified in claim 1 wherein the plurality of LED modules ranges from two to forty modules.

3. The MVLA as specified in claim 2 wherein said LED modules are configured in an array of thirty LED modules.

4. The MVLA as specified in claim 3 wherein the LED array is connected in a serial-parallel combination.

5. The MVLA as specified in claim 1 wherein said MVLA is housed in a hermetically sealed enclosure.

6. The MVLA as specified in claim 5 wherein said enclosure is further comprised of a reflector, a lens and includes structural means for being attached to the rear or to the side of a vehicle.

7. The MVLA as specified in claim 1 wherein said LED drive circuit comprises a voltage regulator.

8. The MVLA as specified in claim 7 wherein said voltage regulator is further comprised of a step-down voltage regulator GL2596 manufactured by the Gleam Corporation.

9. A multi-function vehicle light assembly (MVLA) that operates in combination with a vehicle having a transmission with a reverse position, a turn lever, a brake pedal and a tail light switch, said MVLA comprising:
   a) a vehicle function select circuit (12) having means for receiving and processing:
      (1) a reverse input signal (11) and producing through an isolation diode (D1) a reverse output signal (21),
      (2) a turn input signal (13) and producing through an isolation diode (D2) a turn output signal (23),
      (3) a brake input signal (15) and producing through an isolation diode (D3) a brake output signal (25),
      (4) a tail-light input signal (17) and producing through an isolation diode (D4) a tail-light output signal (27), wherein said function select circuit (12) selectively produces a function select signal (29) that is dependent upon the particular vehicle function that is selected,
   b) an LED drive circuit (14) having means for receiving and processing the function select signal (29) and producing an LED drive signal (31),
   c) a plurality of LED modules (16) each containing a blue LED (DS1), a green LED (DS2) and a red LED (DS3), wherein to the anode of each LED is applied the LED drive signal (31), wherein the output from the module (16) is an LED control signal (33) taken from the respective cathode of each of the three LEDs (DS1), (DS2) and (DS3),
   d) an LED control module (22) having means for receiving and processing the reverse input signal (11), the turn input signal (13), the brake input signal (15) and the tail-light input signal (17), wherein said module (22) has means for determining which LEDs are to be activated and combined to produce an amber light, a white light or a red light, wherein the output of the module (22) is comprised of a blue activation signal (41), a green activation signal (43) and a red activation signal (45),
   e) an LED control circuit (18) comprising:
      (1) a transistor (Q1) having a base that is applied the blue activation signal (41) through a resistor (R1), the collector of transistor (Q1) is connected to the cathode of LED (DS1) and the emitter of transistor (Q1) is connected to circuit ground,
      (2) a transistor (Q2) having a base that is applied the green activation signal (43) through a resistor (R2), the collector of transistor (Q2) is connected to the cathode of LED (DS2) and the emitter is connected to circuit ground, and
      (3) a transistor (Q3) having a base that is applied the red activation signal (45) through a resistor (R3), the collector of transistor (Q3) is connected to the cathode of LED (DS3) and the emitter of transistor (Q3) is connected to circuit ground.

10. The MVLA as specified in claim 9 wherein the plurality of LED modules ranges from two to forty modules.

11. The MVLA as specified in claim 10 wherein said LED modules are configured in an array of thirty LED modules.

12. The MVLA as specified in claim 11 wherein LED array is connected in a serial-parallel combination.

13. The MVLA as specified in claim 9 wherein said MVLA is housed in a hermetically sealed enclosure.

14. The MVLA as specified in claim 13 wherein said enclosure is further comprised of a reflector and a lens.

15. The MVLA as specified in claim 13 wherein said enclosure is dimensioned and structured to function as a vehicle tail light or as a vehicle side light.

16. The MVLA as specified in claim 15 wherein said voltage regulator is further comprised of a step-down voltage regulator GL2596 manufactured by the Gleam Corporation.

17. The MVLA as specified in claim 9 wherein said LED drive module is comprised of a voltage regulator.

18. The MVLA as specified in claim 9 wherein said LED control module is further comprised of a microprocessor.

* * * * *